United States Patent
Sato et al.

(10) Patent No.: US 10,351,936 B2
(45) Date of Patent: Jul. 16, 2019

(54) HIGH-STRENGTH HOT-DIP GALVANIZED STEEL SHEET AND PROCESS FOR PRODUCING THE SAME

(71) Applicant: NIPPON STEEL & SUMITOMO METAL CORPORATION, Tokyo (JP)

(72) Inventors: Koichi Sato, Tokyo (JP); Shintaro Yamanaka, Tokyo (JP); Soshi Fujita, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 123 days.

(21) Appl. No.: 15/376,305

(22) Filed: Dec. 12, 2016

(65) Prior Publication Data

US 2017/0088922 A1 Mar. 30, 2017

Related U.S. Application Data

(62) Division of application No. 14/348,538, filed as application No. PCT/JP2012/075194 on Sep. 28, 2012, now Pat. No. 9,551,055.

(30) Foreign Application Priority Data

Sep. 30, 2011 (JP) .................................. 2011-217143

(51) Int. Cl.

| | |
|---|---|
| C22C 38/06 | (2006.01) |
| C23C 2/02 | (2006.01) |
| C23C 2/06 | (2006.01) |
| C23C 2/28 | (2006.01) |
| C21D 9/46 | (2006.01) |
| C22C 18/04 | (2006.01) |
| B32B 15/01 | (2006.01) |
| C22C 38/00 | (2006.01) |
| C22C 38/02 | (2006.01) |
| C22C 38/04 | (2006.01) |
| C23C 2/26 | (2006.01) |
| C23C 2/40 | (2006.01) |
| C21D 8/02 | (2006.01) |
| C22C 18/00 | (2006.01) |
| C22C 38/12 | (2006.01) |
| C22C 38/14 | (2006.01) |
| C22C 38/38 | (2006.01) |

(52) U.S. Cl.
CPC ............ *C22C 38/06* (2013.01); *B32B 15/013* (2013.01); *C21D 8/0205* (2013.01); *C21D 8/0226* (2013.01); *C21D 8/0284* (2013.01); *C21D 9/46* (2013.01); *C22C 18/00* (2013.01); *C22C 18/04* (2013.01); *C22C 38/001* (2013.01); *C22C 38/002* (2013.01); *C22C 38/005* (2013.01); *C22C 38/02* (2013.01); *C22C 38/04* (2013.01); *C22C 38/12* (2013.01); *C22C 38/14* (2013.01); *C22C 38/38* (2013.01); *C23C 2/02* (2013.01); *C23C 2/06* (2013.01); *C23C 2/26* (2013.01); *C23C 2/28* (2013.01); *C23C 2/40* (2013.01); *C21D 2211/001* (2013.01); *C21D 2211/005* (2013.01); *Y10T 428/12799* (2015.01)

(58) Field of Classification Search
None
See application file for complete search history.

(56) References Cited

U.S. PATENT DOCUMENTS

| | | |
|---|---|---|
| 2011/0024004 A1 | 2/2011 | Azuma et al. |
| 2012/0222781 A1 | 9/2012 | Azuma et al. |

FOREIGN PATENT DOCUMENTS

| | | |
|---|---|---|
| CN | 101999007 A | 3/2011 |
| CN | 102137943 A | 7/2011 |
| EP | 0613958 A1 | 9/1994 |
| EP | 0936275 A1 | 8/1999 |
| EP | 1867747 A1 | 12/2007 |
| EP | 1887746 A1 | 12/2007 |
| EP | 1889935 A1 | 2/2008 |
| EP | 2264206 A1 | 12/2010 |
| JP | 2006-265671 A | 10/2006 |
| JP | 2008-189985 A | 8/2008 |
| JP | 2011-168816 A | 9/2011 |
| WO | WO 2011/065591 A1 | 6/2011 |

OTHER PUBLICATIONS

Machine-English translation of JP2011-214081, Wakita Masayuki et al., Mar. 31, 2010.*
Chinese Office Action and Search Report, dated May 6, 2015, for Chinese Application No. 201280047853.X.
International Search Report, dated Dec. 25, 2012, issued in PCT/JP2012/075194.
English abstract of JP 402194158 A, "Alloyed Hot-Dip Galvanized Steel Sheet and its Production," Jul. 31, 1990, Tamotsu Toki et al.
Non-Final Office Action dated May 25, 2016 for U.S. Appl. No. 14/348,538.
Notice of Allowance dated Sep. 19, 2016 for U.S. Appl. No. 14/348,538.

(Continued)

*Primary Examiner* — Christopher S Kessler
(74) *Attorney, Agent, or Firm* — Birch, Stewart, Kolasch & Birch, LLP (57) ABSTRACT

A high-strength hot-dip galvanized steel sheet containing a main component, the steel sheet having at least 40 wt. % of ferrite as a main phase in terms of the volumetric ratio, and 8-60% inclusive of residual austenite, the remaining structure comprising one or more of bainite, martensite, or pearlite. Austenite particles within a range where the average residual stress (sigmaR) thereof satisfies the expression $-400 \text{ MPa} \leq \text{sigmaR} \leq 200 \text{ MPa}$ (formula (1)) are present in an amount of 50% or more in the hot-dip galvanized steel sheet. The surface of the steel sheet has a hot-dip galvanized layer containing less than 7 wt. % of Fe, the remainder comprising Zn, Al and inevitable impurities.

6 Claims, 3 Drawing Sheets

(56) References Cited

OTHER PUBLICATIONS

"Hot dip galvanizing line No. 5" Brochure, Voestalpine Stahl GmbH, Austria, (2 pages) 2011.
"Strip Processing Lines Product Portfolio, Technology and References" Brochure, SMS Group, Oct. 1, 2017, pp. 1-96.
Fukushima, "Recent Technological Progress in High Speed Continuous Annealing," Transactions ISIJ, vol. 25, 1985, pp. 278-293.
Traint et al., "Alloy Design, Processing and Properties of TRIP Steels: A Critical Comparison," AHSSS Proceedings, 2004, pp. 79-98.

* cited by examiner

HIGH-STRENGTH HOT-DIP GALVANIZED STEEL SHEET AND PROCESS FOR PRODUCING THE SAME

CROSS-REFERENCE TO RELATED APPLICATIONS

This application is a Divisional of application Ser. No. 14/348,538, filed on Mar. 28, 2014, which is the national stage entry of PCT International Application No. PCT/JP2012/075194, filed on Sep. 28, 2012, which claims the priority benefit under 35 U.S.C. § 119(a) to Patent Application No. JP 2011-217143, filed in Japan on Sep. 30, 2011, all of which are hereby expressly incorporated by reference into the present application.

TECHNICAL FIELD

The present invention relates to a high-strength (for example, a tensile strength of 980 MPa or more) hot-dip galvanized steel sheet with excellent bendability, which is used for an automotive structural material and the like, and a process for producing the same.

BACKGROUND ART

For the purpose of enhancing the fuel efficiency of an automobile and achieving collision safety, application of a high tensile strength steel sheet to a vehicle body frame structure is proceeding, but on the other hand, the increase in the strength of a material involves a decrease in formability of the material, and therefore, the steel sheet used may be required to satisfy both high press workability and high strength.

In a high-strength steel sheet, a retained (or residual) austenite steel having retained austenite in the steel structure may be known to, despite high strength, exhibit very high elongation by making use of a TRIP effect, In order to more increase the elongation of this retained austenite steel, for example, Patent Document 1 discloses a technique of ensuring uniform elongation by controlling two kinds of ferrite (bainitic ferrite and polygonal ferrite) while keeping the retained austenite fraction high.

Meanwhile, in forming a high-strength steel sheet having a tensile strength of 980 MPa or more, the work may be often performed mainly by bend forming but not draw forming that has prevailed in forming a low-strength steel sheet having a tensile strength of 440 MPa or less. Similarly to elongation, enhanced bendability may be required of also a high-strength sheet steel.

Conventionally, it has been known that V-bendability correlates with local ductility, and as a technique for enhancing the local ductility, Patent Document 1 discloses a technique of making the structure uniform and increasing the strength by adding a precipitation strengthening component to a ferrite single phase, and Patent Document 2 discloses a technique of similarly making the structure uniform by a structure mainly composed of bainite.

Also, Patent Document 3 discloses a high-strength high-ductility hot-dip galvanized steel sheet containing, in terms of volume fraction, from 30 to 90% of a ferrite phase, 5% or more of bainite, 10% or less of martensite, and from 5 to 30% of a retained austenite phase. Patent Document 4 discloses a high-strength cold-rolled steel sheet, where the density of dislocations contained in the steel sheet is $8\times10^{11}$ (dislocations/mm$^2$) or less, and the static/dynamic ratio (=FS2/FS1) as a ratio between a quasi-static strength (FS1) at a strain rate of 0.0067 (s$^{-1}$), and a dynamic strength (FS2) at a strain rate of 1,000 (s$^{-1}$) is 1.05 or more.

However, at present, higher strength and higher workability are required of also in the case of a high-strength steel sheet, and a technique capable of satisfying this requirement and also of satisfying both of the elongation and V-bendability at a sufficiently high level is not known.

RELATED ART

Patent Documents

[Patent Document 1] JP-A (Japanese Unexamined Patent Publication; KOKAI) No. 2003-306746
[Patent Document 2] JP-A No. 4-88125
[Patent Document 3] JP-A No. 2005-133201
[Patent Document 4] JP-A No. 2002-30403

SUMMARY OF THE INVENTION

Problem to be Solved by the Invention

The present invention has been made to solve conventional problems, and an object of the present invention is to provide a high-strength hot-dip galvanized steel sheet excellent in elongation and V-bendability, which is a technique found from many diligent studies to enhance the V-bendability of a retained austenite steel having a tensile strength of 980 MPa or more, and a production process therefor.

Means for Solving the Problem

As a result of earnest study, the present inventors have found that increasing the stability of retained austenite more than ever by imparting a residual compression stress to the retained austenite phase may effectively act on the local bending deformation of the tensile stress part outside bending and the compression stress part inside bending.

As a result of further study based on the above discovery, the present inventors have further made studies based on the finding above, as a result, it has been found that when the roll diameter, tension and number of passes in repeated bending during an over-aging (OA) treatment are optimally controlled so as to impart a residual compression stress to the retained austenite phase, a sufficiently high effect may be obtained on elongation and V-bendability. The present inventors have still further made studies based on the finding above, as a result, it has been found that when control of conditions in repeated bending during an over-aging (OA) treatment is conformed to control of the enrichment into austenite phase and the grain size, the stability of retained austenite phase can be increased and this may be more effective for elongation and V-bendability.

According to the knowledge and investigations of the present inventors, the mechanism for providing the above-described effect in the present invention may be presumed as follows.

Thus, the retained austenite steel may be a high-strength steel sheet obtained by controlling ferrite transformation and bainite transformation during annealing to increase the C concentration in austenite and thereby retain austenite in the steel structure of a product, and thanks to TRIP effect of the retained austenite, capable of exhibiting high elongation. However, because of a mixed structure, such a retained austenite steel may be presumed not to be a steel excellent in bendability.

Meanwhile, the present inventors have made various studies on the method for obtaining desired tensile strength, ductility, V-bendability and plating property by performing, in a laboratory, melting, hot rolling, cold rolling, annealing and hot-dip galvanization of various steels changed in the amounts of C, Si and Mn with an attempt to achieve an effective action of TRIP effect on bendability.

As a result of these earnest study, it has been found that when not only various components effective for the above-described purpose are specified but also a residual compression stress is imparted to the retained austenite phase, the stability of retained austenite may be increased more than ever and at the same time, an effective action may be exerted on the local bending deformation of the tensile stress part outside bending and the compression stress part inside bending.

The present inventors have accomplished the present invention, based on the above discoveries. The present invention may include, for example, the following embodiments.

[1] A hot-dip galvanized steel sheet, which is a steel sheet comprising, in mass %,
C: from 0.10 to 0.4%,
Si: from 0.01 to 0.5%,
Mn: from 1.0 to 3.0%,
O: 0.006% or less,
P: 0.04% or less,
S: 0.01% or less,
Al: from 0.1 to 3.0%,
N: 0.01% or less, and
Si+Al≥0.5%, with the balance being Fe and unavoidable impurities,
wherein the steel sheet is a high-strength hot-dip galvanized steel sheet comprising, as the main phase, in terms of volume fraction, 40% or more of ferrite and from 8 to 60% of retained austenite, and the balance structure is composed of any one member or two or more members of bainite, martensite and pearlite,
wherein out of the austenite, an austenite grain having an average residual stress σR satisfying formula (1) accounts for 50% or more:

$$-400 \text{ MPa} \leq \sigma R \leq 200 \text{ MPa} \quad (1)$$

and
wherein the steel sheet has, on the surface thereof, a hot-dip galvanized layer comprising Fe in an amount of less than 7 mass %, with the balance being Zn, Al and unavoidable impurities.

[2] The hot-dip galvanized steel sheet according to [1], wherein the average particle size of the austenite is 10 μm or less, the average C concentration in the austenite is 0.7% or more to 1.5% or less in terms of mass %.

[3] The hot-dip galvanized steel sheet according to [1] or [2], wherein the average aspect ratio with respect to the rolling direction of the austenite grain is from 0.5 to 0.95.

[4] The hot-dip galvanized steel sheet according to [1] or [2], wherein the steel sheet further comprises one member or two or more members of, in mass %,
Mo: from 0.02 to 0.5,
Nb: from 0.01 to 0.10%,
Ti: from 0.01 to 0.20%,
V: from 0.005 to 0.10%,
Cr: from 0.1 to 2.0%,
Ca: from 0.0005 to 0.05%,
Mg: from 0.0005 to 0.05%,
REM: from 0.0005 to 0.05%,
Cu: from 0.04 to 2.0%,
Ni: from 0.02 to 1.0%,
B: from 0.0003 to 0.007%.

[5] A process for producing a hot-dip galvanized steel sheet, comprising subjecting a steel material comprising, in mass %,
C: from 0.10 to 0.4%,
Si: from 0.01 to 0.5%,
Mn: from 1.0 to 3.0%,
O: 0.006% or less,
P: 0.04% or less,
S: 0.01% or less,
Al: from 0.1 to 3.0%,
N: 0.01% or less, and
Si+Al≥0.5%, with the balance being Fe and unavoidable impurities, to a hot rolling treatment at a hot-rolled slab temperature of 1,100° C. or more and a finishing temperature of 850 to 970° C.,
cooling the steel sheet after the hot rolling to a temperature region of 650° C. or less at 10 to 200° C./sec on average, and taking it up in a temperature range of 650° C. or less,
cold-rolling the steel sheet at a rolling reduction ratio of 40% or more,
annealing the steel sheet by setting the maximum temperature during annealing to be from 700 to 900° C., cooling the steel sheet to a temperature region of 350 to 550° C. at an average cooling rate of 0.1 to 200° C./sec, and then holding it in the temperature region for 1 to 1,000 seconds, and
immersing the steel sheet after holding in the temperature region in a hot-dip galvanizing bath and after the plating treatment, applying an alloying treatment at a temperature of 470 to 580° C.,
wherein at the time of holding the steel sheet in a temperature region of 350 to 550° C., the steel sheet is repeatedly bent using a roll having a roll diameter of 50 to 2,000 mm to thereby impart a strain to the steel sheet, and
the longitudinal average stress applied to the steel sheet during the repeated bending is from 2 to 50 MPa.

[6] The process for producing a hot-dip galvanized steel sheet according to [5], wherein the number of passes during the repeated bending is from 2 to 6.

EFFECT OF THE INVENTION

The present invention can provide a hot-dip galvanized steel sheet having a high strength and being excellent in the ductility and V-bendability. The production of the hot-dip galvanized steel sheet according to the present invention may be relatively easy and can be performed stably. Therefore, the hot-dip galvanized steel sheet may be optimally usable particularly as a steel sheet for automobiles in recent years, which is intended for attaining weight reduction. As a result, the industrial value thereof may be remarkably high.

MODES FOR CARRYING OUT THE INVENTION

The high-strength thin steel sheet of the present invention may be the result of attention focused on increasing the stability of retained austenite phase in a retained austenite steel. The present invention has been achieved, as described above, based on finding that by controlling the residual stress and aspect ratio of the retained austenite phase, the stability can be increased to an extreme and all of strength, elongation and V-bendability can be satisfied at a high level.

The structure in the hot-dip galvanized steel sheet of the present invention must be mainly composed of a ferrite phase and a bainite phase and contain 3% or more of a retained austenite phase. In the case of intending to achieve a higher strength, the structure may contain martensite, but if the structure is not mainly composed of a ferrite phase and a bainite phase, elongation may be likely to significantly decrease.

Figure 1:
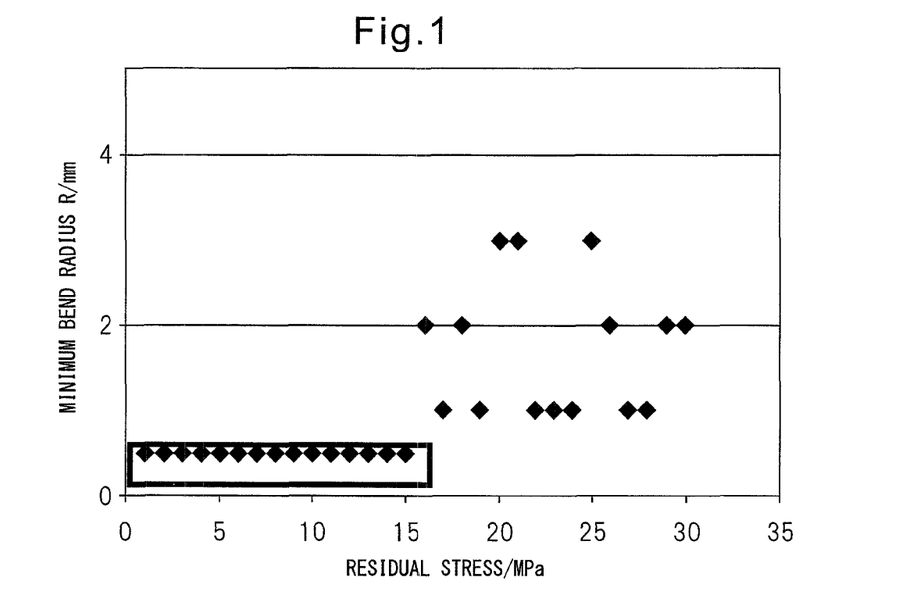
FIG. 1 is a graph showing a relationship between the residual stress in retained austenite phase and the minimum bend radius R.

The residual stress in the retained austenite phase may be one of most important factors in the present invention. As shown in FIG. 1, when the residual stress in the retained austenite phase is lower, particularly, is 15 MPa or less, the minimum bend radius R may become smallest. A residual compression stress may be imparted to individual retained austenite grains in the production process, whereby martensite transformation during work may be retarded, as a result, the stability of the whole phase may be increased.

Figure 2:
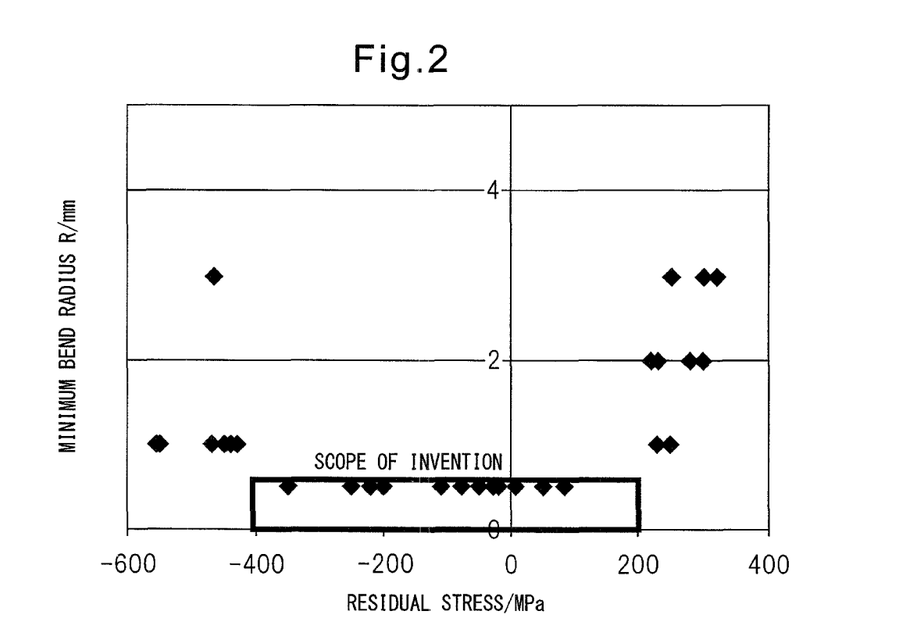
FIG. 2 is a graph showing the range where the average residual stress σR of an austenite grain satisfies formula (1).
Figure 3:
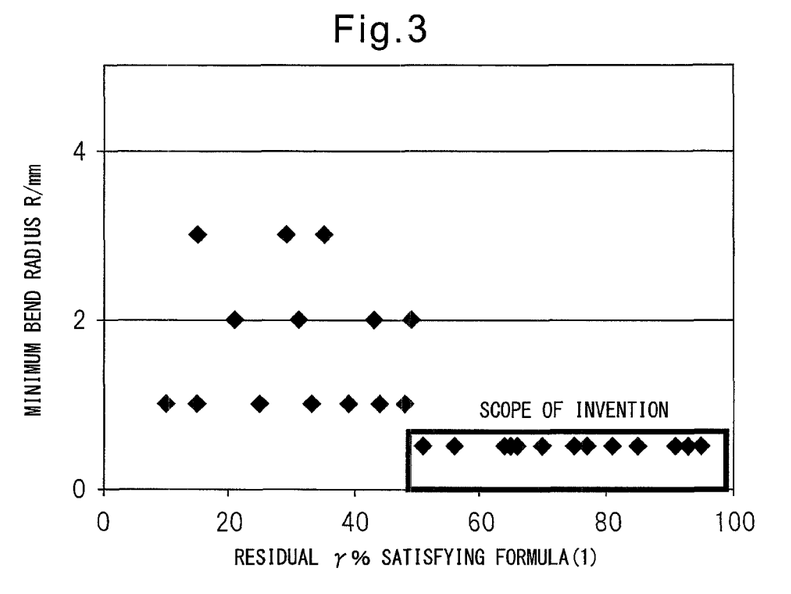
FIG. 3 is a graph showing a relationship between the percentage of austenite grain satisfying formula (1) and the minimum bend radius R.

In order to achieve this effect, as shown in FIG. 2, $\Sigma r$ may become minimum in the range where the average residual stress $\sigma R$ of the austenite grain satisfies formula (1). Also, as shown in FIG. 3, when the austenite grain satisfying formula (1) accounts for 50% or more, the minimum bend radius R may stably become smallest.

$$-400 \text{ MPa} \leq \sigma R \leq 200 \text{ MPa} \tag{1}$$

The method for measuring the percentage of retained austenite may be any method as long as it is a measuring method guaranteeing the accuracy, but, for example, the measurement was performed on a surface formed by chemical polishing to a ¼ thickness from the surface layer of the sample material sheet, and the retained austenite was quantitatively determined from the integrated intensities of (200) and (211) planes of ferrite and the integrated intensities of (200), (220) and (311) planes of austenite, which were measured with a mono-chromatized MoK$\alpha$ ray. The method for measuring $\sigma R$ may be any method as long as it is a measuring method where accuracy is guaranteed under the condition of exactly obtaining a residual stress, but in the present invention, on a surface formed by chemical polishing to a ¼ thickness from the surface layer of the sample material sheet, measurement of a residual stress of arbitrary 50 retained austenite grains may be carefully performed by a stress measuring method using a high-precision radiation X-ray diffraction having a beam system of 5 $\mu$m$\phi$, and the percentage of retained austenite grain falling in the range of (1) can be thereby obtained.

Figure 4:
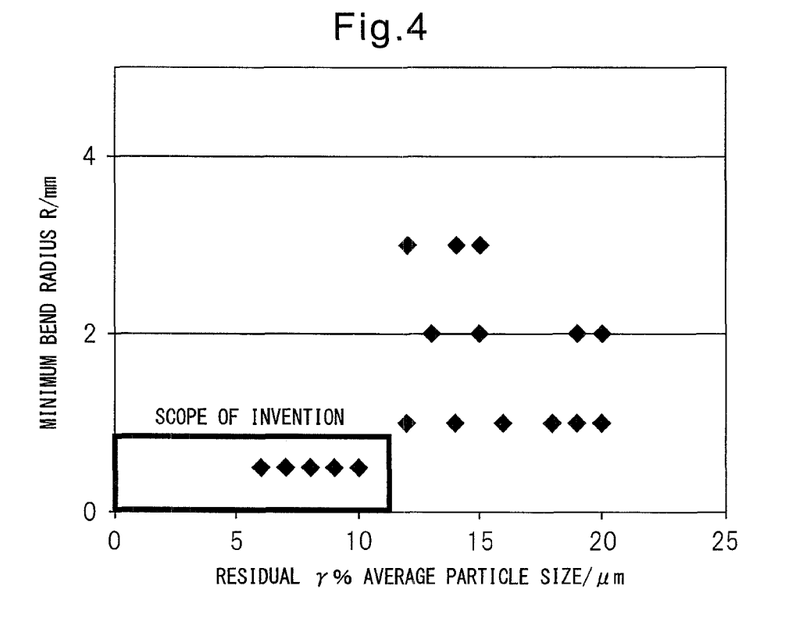
FIG. 4 is a graph showing a relationship between the average grain size of retained austenite and the minimum bend radius R.

In the present invention, the average grain size of retained austenite may be preferably 10 $\mu$m or less. As shown in FIG. 4, if the average grain size exceeds 10 $\mu$m, the dispersion of retained austenite phase may be coarsened, and the TRIP effect may not be fully exerted, giving rise to reduction in elongation. Here, the method for measuring the average grain size (average equivalent-circle diameter) may be any method as long as it is a measuring method guaranteeing accuracy, but, for example, the steel sheet in a cross-section in the rolling direction or in a cross-section perpendicular to the rolling direction was etched with a nital reagent, and the average grain size was quantitatively determined by observation through an optical microscope at 500 times.

Figure 5:
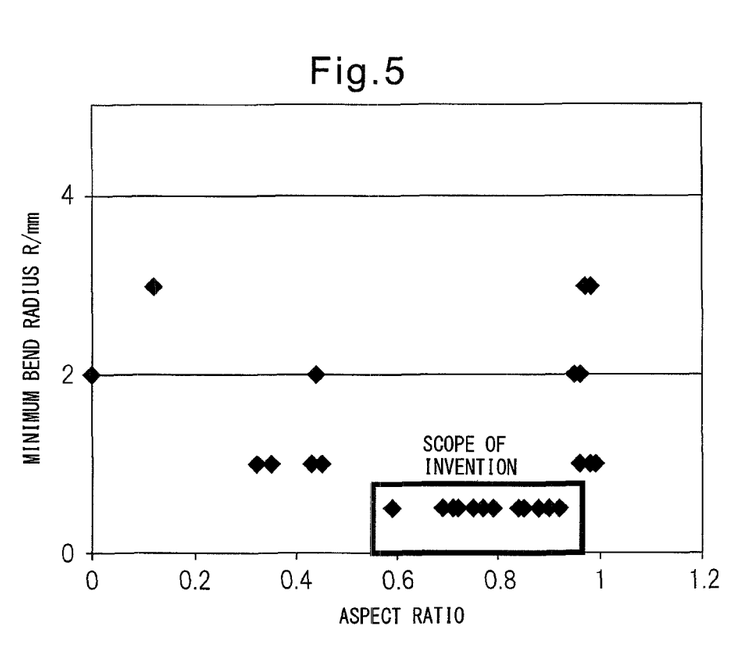
FIG. 5 is a graph showing a relationship between the aspect ratio of retained austenite grain and the minimum bend radius R.

Also, as shown in FIG. 5, when the aspect ratio of the retained austenite grain is from 0.5 to 0.95 with respect to the rolling direction, the minimum bend radius may advantageously become smallest. If the aspect ratio exceeds 0.95 or less than 0.5, the stability of retained austenite may vary during bending deformation. Here, the method for measuring the aspect ratio may be any method as long as it is a measuring method guaranteeing accuracy, but for example, the steel sheet in a cross-section in the rolling direction or in a cross-section perpendicular to the rolling direction was etched with a nital reagent, the grain size was quantitatively determined by observation through an optical microscope at 500 times, the grain size in the rolling direction and the grain size in a direction perpendicular to rolling were measured on 30 retained austenite grains by an image processing software to determine the aspect ratio, and an average value thereof was taken as a representative value of the material.

Figure 6:
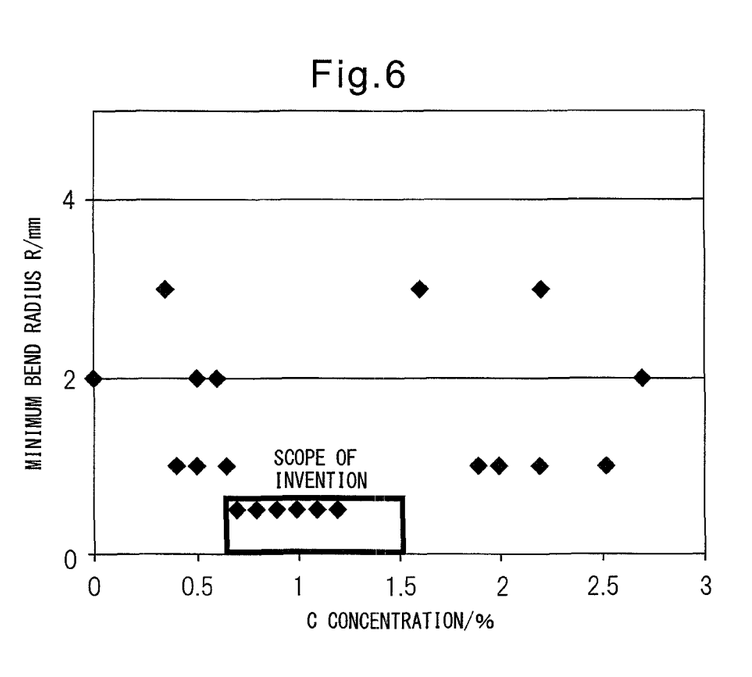
FIG. 6 is a graph showing a relationship between the C concentration and the minimum bend radius R.

The average C concentration of retained austenite may also greatly contribute to stability of the retained austenite. As shown in FIG. 6, if the average C concentration is less than 0.7% in terms of mass %, the stability of retained austenite may be extremely reduced and therefore, the TRIP effect cannot be effectively exerted, resulting in deterioration of elongation. On the other hand, even if the concentration exceeds 1.5%, not only the elongation improving effect may be saturated but also the cost for the production may be increased. For this reason, the concentration may be preferably from 0.7 to 1.5%. Here, the method for measuring the C concentration may be any method as long as it is a measuring method where accuracy is guaranteed under the condition of exactly obtaining a resolved concentration, but, for example, the C concentration can be obtained by using a FE-SEM-attached EPMA and carefully measuring the concentration at a pitch of 0.5 $\mu$m or less.

First, the reasons for the limitation on the components of a steel sheet are described. In this connection, "%" means mass %.

C:

C may be an element capable of increasing the strength of the steel sheet. However, if its content is less than 0.1%, it may be difficult to satisfy both of the tensile strength of 980 MPa or more, and the workability. On the other hand, if the content exceeds 0.40%, spot weldability can be hardly ensured. For this reason, the range of the C content is set to be from 0.1 to 0.40% or less. The C content may preferably be from 0.13 to 0.3, more preferably from 0.19 to 0.28.

Si:

Si may be an alloying (or strengthening) element and may be effective in increasing the strength of the steel sheet. Also, this element may suppress the precipitation of cementite and in turn, contribute to stabilization of retained austenite, and therefore, its addition may be indispensable. If its content is less than 0.01%, the effect of increasing the strength may be small. On the other hand, if the content exceeds 0.5%, the workability may be reduced. For this reason, the Si content is set to be from 0.01 to 0.5%. The Si content may preferably be from 0.2 to 0.5%, more preferably from 0.1 to 0.45%.

Mn:

Mn may be an alloying element and may be effective in increasing the strength of the steel sheet. However, if its content is less than 1.0%, the tensile strength of 980 MPa or more may be difficult to obtain. On the other hand, if the content is large, co-segregation with P or S may be promoted to involve significant deterioration of the workability and therefore, an upper limit of 3.0% is specified. For this reason, the Mn content is set to be from 1.0 to 3.0%. The Mn content may preferably be from 1.0 to 2.8%, more preferably from 1.0 to 2.8%.

O:

O may form an oxide and deteriorate the elongation, bendability or hole expandability and therefore, the amount added of this element must be kept low. Among others, an oxide may often exist as an inclusion and when the oxide is present in the punched edge face or cut surface, a notched flaw or a coarse dimple may be formed on the end face to invite stress concentration during hole expansion or severe working and serve as an origin of crack formation, giving rise to significant deterioration of the hole expandability or bendability. If the content of O exceeds 0.006%, the above-described tendency may be conspicuous, and therefore, the O content is specified to an upper limit of 0.006% or less. That is, O is limited as an impurity to 0.006% or less. The upper limit of the O content may preferably be 0.005% or less, more preferably 0.004% or less. On the other hand, an O content of less than 0.0001% may be economically disadvantageous because of involving an excessive rise in the cost, and therefore, this value may be substantially the lower limit.

P:

P may tend to be segregated at the center in the sheet thickness of the steel sheet and bring about embrittlement of a welded part. If its content exceeds 0.04%, significant embrittlement of the welded part may occur, and therefore, a proper content range of 0.04% or less is specified. That is, P is limited as an impurity to 0.04% or less. The P content may preferably be 0.03% or less, more preferably 0.025% or less. The lower limit of P content may not be particularly specified, but a content of less than 0.0001% may be economically disadvantageous, and therefore, this value may preferably be set as the lower limit.

S:

S may adversely affect the weldability and manufacturability during casting and hot rolling. For this reason, the upper limit of its content is set to 0.01% or less. That is, S is limited as an impurity to 0.01% or less. The S content may preferably be 0.004% or less, more preferably 0.003% or less. The lower limit of S content may not be particularly specified, but a content of less than 0.0001% may be economically disadvantageous, and therefore, this value may preferably be set as the lower limit. In addition, since S may be bound to Mn to form coarse MnS and deteriorate the bendability or hole expandability, the content of this element should be set as low as possible.

Al:

Al may promote ferrite formation to enhance the ductility and therefore, may be added. This element may also be utilized as a deoxidizing agent. If its content is less than 0.1%, the effect of the element may be insufficient. On the other hand, its excessive addition may lead to an increase in the number of Al-based coarse inclusions and give rise to deterioration of hole expandability or cause a surface flaw. For this reason, the upper limit of the Al content is set to 3.0%. The Al content may preferably be from 0.1 to 2.9%, more preferably from 0.15 to 2.9%.

In the present invention, (Al+Si) is set to 0.5% or more. The (Al+Si) may preferably be 0.5 to 4%, more preferably 0.51 to 3.5%

N:

N may form a coarse nitride to deteriorate the bendability or hole expandability and therefore, the amount added thereof must be kept low. If the N content exceeds 0.01%, the tendency above may be conspicuous, and therefore, the range of the N content is set to 0.01% or less. N can be a cause for the formation of a blow hole during welding, and accordingly, the N content may be smaller. The N content may preferably be 0.005% or less, more preferably 0.004% or less. Although the effect according to the present invention can be achieved without particularly specifying the lower limit, an N content of less than 0.0005% may involve a great increase in the production cost, and therefore, this value may be substantially the lower limit.

Mo:

Cr may be an alloying element and may be important in enhancing the quenchability. However, if its content is less than 0.02%, these effects may not be obtained, and therefore, a lower limit of 0.02% is specified. On the contrary, containing this element in excess of 0.5% may adversely affect the manufacturability during production and hot rolling, and therefore, an upper limit of 0.5% is specified.

Nb:

Nb may be an alloying element and may contribute to increase in the strength of the steel sheet by precipitation strengthening, fine grain strengthening through suppressing growth of a ferrite crystal grain, and dislocation strengthening through suppressing recrystallization. If the amount added thereof is less than 0.01%, these effects may not be obtained, and therefore, a lower limit of 0.01% is specified. If this element is contained in excess of 0.1%, the amount of carbonitride precipitated may be increased to deteriorate the formability, and therefore, an upper limit of 0.1% is specified.

Ti:

Ti may be an alloying element and may contribute to increasing the strength of the steel sheet by precipitation strengthening, fine grain strengthening through suppressing growth of a ferrite crystal grain, and dislocation strengthening through suppressing recrystallization. If the amount added thereof is less than 0.01%, these effects may not be obtained, and therefore, a lower limit of 0.01% is specified. If this element is contained in excess of 0.2%, the amount of carbonitride precipitated may be increased to deteriorate the formability, and therefore, an upper limit of 0.2% is specified.

V:

V may be an alloying element and may contribute to increasing the strength of the steel sheet by precipitation strengthening, fine grain strengthening through suppressing growth of a ferrite crystal grain, and dislocation strengthening through suppressing recrystallization. If the amount added thereof is less than 0.005%, these effects may not be obtained, and therefore, a lower limit of 0.005% is specified. If this element is contained in excess of 0.1%, the amount of carbonitride precipitated may be increased to deteriorate the formability, and therefore, an upper limit of 0.1% is specified. The V content may preferably be from 0.005 to 0.4%, more preferably from 0.005 to 0.3%.

Cr:

Cr may be an alloying element and at the same time, may be important in enhancing the quenchability. However, if its content is less than 0.1%, these effects may not be obtained, and therefore, a lower limit of 0.1% is specified. On the contrary, containing this element in excess of 2.0% may adversely affect the manufacturability during production and hot rolling, and therefore, an upper limit of 2.0% is specified.

One member or two or more members selected from Ca, Mg and REM may be added in a total amount of 0.0005 to 0.04%. Ca, Mg and REM may be an element used for deoxidization, and it may be preferred to contain one member or two or more members thereof in a total amount of 0.0005% or more. Here, REM is Rare Earth Metal. However, if the total content of Ca, Mg and REM exceeds 0.05%, degradation of forming workability may be caused. For this reason, the total content thereof is set to be from 0.0005 to 0.05%.

Incidentally, in the present invention, REM may be added in the form of misch metal in many cases, and there may be a case in which a combination of elements in the lanthanoid series is contained in addition to La and Ce. Even when such elements in the lanthanoid series other than La and Ce are contained as unavoidable impurities, the effects according to the present invention may be brought out. In this connection, the effects according to the present invention may also be brought out even when metallic La and Ce are added.

Cu:

Cu may be an alloying element and at the same time, may be important in enhancing the quenchability. In addition, Cu may enhance the wettability of molten metal or promote an alloying reaction and therefore, may be added. However, if its content is less than 0.04%, these effects may not be obtained, and therefore, a lower limit of 0.04% is specified. On the contrary, containing this element in excess of 2.0% may adversely affect the manufacturability during production and hot rolling, and therefore, an upper limit of 2.0% is specified.

Ni:

Ni may be an alloying element and at the same time, may be important in enhancing the quenchability. In addition, Ni may enhance the wettability of molten metal or promote an alloying reaction and therefore, may be added. However, if its content is less than 0.02%, these effects may not be obtained, and therefore, a lower limit of 0.02% is specified. On the contrary, containing this element in excess of 1% may adversely affect the manufacturability during production and hot rolling, and therefore, an upper limit of 1.0% is specified.

Addition of B in an amount of 0.0003% or more may be effective in strengthening a grain boundary or increasing the strength of steel material, but if the amount added exceeds 0.07%, not only the effect may be saturated but also the manufacturability during hot rolling may be reduced, and therefore, an upper limit of 0.07% is specified.

Next, the structure of the steel material may be described below.

In the steel sheet according to the present invention, ferrite is used as a main phase, and retained austenite of volume fraction of 8% or more is dispersed therein, to thereby secure a tensile strength of 980 MPa or more. Accordingly, the steel sheet should contain retained austenite. As the form of ferrite, acicular ferrite may be incorporated other than polygonal ferrite. The reason why ferrite is used as the main phase may be because by forming the main phase from ferrite rich in ductility, the ductility may be enhanced. If the content of the ferrite phase as the main phase is less than 40%, sufficient ductility may not be secured, and the steel sheet may not be suited for practical use. For this reason, the volume fraction of main-phase ferrite is set to 40% or more.

Retained austenite is contained as a second phase, whereby increase in strength and more enhancement of ductility may be achieved at the same time. If the volume fraction thereof is less than 8%, the effect above may be hardly obtained, and therefore, a lower limit of less than 8% is specified. The reason why the upper limit is set to 60% or less is because if its volume fraction exceeds 60%, the volume fraction of ferrite phase as the main phase may become less than 40%, and sufficient ductility may not be secured. The bainite structure may be utilized for the stabilization of retained austenite and therefore, may be unavoidably contained. For further increasing the strength, martensite may be contained.

With respect to the above-described microstructure phases, ferrite, martensite, bainite, austenite, pearlite and the balance structure, the identification, observation of existing position, and measurement of area ratio can be performed by using a nital reagent and a reagent disclosed in JP-A No. 59-219473 to etch the steel sheet in the rolling direction cross-section or the cross-section in the direction perpendicular to the rolling direction and effecting a quantitative determination by observation through an optical microscope at 1,000 times and scanning and transmission electron microscopes at 1,000 to 100,000 times. After observation of 20 or more visual fields for each, the area ratio of each structure can be determined by a point counting method or image analysis.

The production process for the high-strength hot-dip galvanized steel sheet with excellent plating adhesion according to the present invention is described below.

A slab before hot rolling may be subjected to normal hot rolling after continuous casting.

For example, a slab after continuous casting is set to 1,100° C. or more directly or through re-heating. At a temperature less than the temperature above, insufficient homogenization may result to cause a reduction in the strength and V-bendability.

Subsequently, the slab is hot-rolled at a finishing temperature of 850 to 970° C. Because, if the finishing temperature is less than 850° C., the rolling may be ($\alpha+\gamma$) two-phase region rolling, and rollability may be deteriorated, whereas if the finishing temperature exceeds 970° C., the austenite grain size may be coarsened, and the ferrite phase fraction may become small, giving rise to reduction in ductility.

Thereafter, the slab is cooled to a temperature region of 650° C. or less at 10 to 200° C./sec on average, and then taken up at a temperature of 650° C. or less. If the cooling rate is less than the range above or the take-up temperature exceeds the range above, a pearlite phase that significantly deteriorates the bendability may be produced. If the average cooling rate exceeds 200° C./sec, the effect of suppressing pearlite may be saturated, and the cooling endpoint temperature may significantly vary, making it difficult to ensure a stable material quality. For this reason, the cooling rate is set to 200° C./sec or less.

After pickling, the sample material may be subjected to cold rolling of 40% or more. If the rolling reduction is less than this range, recrystallization or reverse transformation during annealing may be suppressed to cause reduction in the elongation.

The maximum temperature during annealing is set to be from 700 to 900° C. If the maximum temperature is less than 700° C., recrystallization of a ferrite phase during annealing may be retarded to cause reduction in the elongation. On the other hand, at a temperature in excess of the temperature above, the martensite fraction may be increased to cause deterioration of the elongation.

In order to freeze the structure and effectively bring out bainite transformation during cooling after a soaking treatment in the annealing step, the cooling rate may be preferably higher. In this connection, if the cooling rate is less than 0.1° C./sec, the transformation cannot be controlled, whereas even if the cooling rate exceeds 200° C./sec, the effect may be saturated and in addition, the temperature controllability of the cooling endpoint temperature that is most important for the production of retained austenite may be significantly deteriorated. For this reason, the cooling rate after annealing may be preferably from 0.1 to 200° C./sec on average. The cooling rate may be, on average, more preferably from 1.2 to 14° C./sec, still more preferably from 1.8 to 11° C./sec.

The cooling endpoint temperature and subsequent holding or leaving to cool may be an important technique to control the production of bainite and determine the C concentration of retained austenite. If the cooling endpoint temperature is less than 350° C., a large amount of martensite may be produced to excessively increase the steel strength and in addition, it may be difficult to retain austenite, as a result, elongation may be deteriorated to an extremely large extent. On the other hand, if the cooling endpoint temperature exceeds 550° C., the bainite transformation may be retarded and in addition, production of cementite may occur during holding or leaving to cool, decreasing the C enrichment in retained austenite. For this reason, the cooling stop temperature and the holding or leaving-to-cool temperature, where retained austenite having a high C concentration can be produced at 8% or more, may be preferably from 350 to 550° C.

The holding or leaving-to-cool time may be preferably longer in view of C enrichment into retained austenite. If the time is less than 1 second, bainite transformation may not sufficiently occur, and inadequate C enrichment may result. On the other hand, if the time exceeds 1,000 seconds, cementite may be produced in the austenite phase and in turn, the C concentration may be likely to decrease. For this reason, it may be preferred to set the holding or leaving-to-cool time to be from 1 to 1,000 seconds. The holding or leaving-to-cool time may be preferably from 110 to 800 seconds, more preferably from 150 to 400 seconds.

The residual stress in austenite phase and the aspect ratio of retained austenite grain can be controlled by optimally controlling the roll diameter, tension and number of passes in repeated bending during holding (during an over-aging (OA) treatment), but when the over-aging (OA) treatment time is set to be from 350 to 550° C., all of the following requirements must be satisfied. The roll diameter may be preferably smaller so as to impart a certain strain. However, if the roll diameter is 50 mm or less, the roll rigidity may be decreased and a stable strain cannot be imparted. On the other hand, if the roll diameter exceeds 2,000 mm, the surface-contact area may be increased, making it impossible to locally impart a large strain. For this reason, the roll diameter may be preferably from 50 to 2,000 mm. The lower limit may be more preferably 350 mm or more, and the upper limit may be preferably 1,000 mm or less.

Also, the tension may be adjusted by the longitudinal average stress that is a value obtained by dividing the tension by the sheet's cross-sectional area (sheet thickness×sheet width) and may be an important value for determining the aspect ratio in the longitudinal direction, but if the strength (TS) of steel sheet when the over-aging (OA) temperature is set to be from 350 to 550° C. exceeds 50%, the risk of fracture may increase. Since the strength of 980 MPa steel at 350° C. may be about 100 MPa, the tension (longitudinal average stress) may be suitably 50 MPa or less. This tension (longitudinal average stress) may be preferably 45 MPa or less, more preferably 40 MPa or less. The lower limit may not be specifically specified, but considering the passability of steel sheet, particularly meandering, the tension may be preferably 2 MPa or more, more preferably 10 MPa or more.

As for the number of passes, a larger number of passes may increase the occurrence of bending/unbending and facilitate the control of residual stress, but the effect may be small in one pass. For this reason, 2 passes or more may be usually preferred. The number of occurrences of bending may be preferably 6 passes or less, more preferably 5 passes or less.

Thereafter, the steel sheet is immersed in a hot-dip galvanizing bath. In the technique of the present invention, an alloying treatment is performed after the immersion. At this time, an alloying treatment of the plating layer is performed at 470 to 580° C. At a temperature lower than this range, alloying may be insufficient, whereas at a temperature exceeding the range above, over-alloying may occur and the corrosion resistance may be significantly deteriorated.

EXAMPLES

Hereinbelow, the present invention may be described in more detail below by referring to Examples.

A steel having the component composition shown in Table 1 was produced, cooled/solidified, then re-heated to 1,200° C., finish-rolled at 880° C., cooled, further cooled to 550° C. at an average cooling rate of 60° C./sec, and taken up at the take-up temperature shown in Table 2. Thereafter, the resulting hot-rolled sheet was subjected to cold rolling of 50% and then annealed by continuous annealing under the conditions shown in Table 2.

Assuming the effects of roll diameter, tension and number of passes in repeated bending during an over-aging (OA) treatment in an actual production line, a plurality of different curvatures, tensions and occurrence numbers were given during OA of the annealing treatment, and the effect on the residual stress was evaluated.

TABLE 1

| No. of Steel Species | C | Si | Mn | O | P | S | N | Al | Al + Si | Others |
|---|---|---|---|---|---|---|---|---|---|---|
| 1 | 0.12 | 0.25 | 2.7 | 0.005 | 0.01 | 0.002 | 0.004 | 0.25 | 0.50 | — |
| 2 | 0.1 | 0.25 | 2.4 | 0.003 | 0.012 | 0.003 | 0.0033 | 0.28 | 0.53 | — |
| 3 | 0.12 | 0.45 | 1.62 | 0.001 | 0.011 | 0.004 | 0.0043 | 2.78 | 3.23 | Cr: 1.26 |
| 4 | 0.15 | 0.02 | 2.5 | 0.001 | 0.013 | 0.004 | 0.0022 | 1.63 | 1.65 | Ce: 0.01, La: 0.002, V: 0.4 |
| 5 | 0.35 | 0.30 | 1.6 | 0.002 | 0.012 | 0.01 | 0.0022 | 1.84 | 2.14 | — |
| 6 | 0.27 | 0.10 | 2.45 | 0.004 | 0.01 | 0.0013 | 0.0024 | 2.53 | 2.63 | Mg: 0.0008 |
| 7 | 0.32 | 0.28 | 2.5 | 0.004 | 0.02 | 0.0023 | 0.0029 | 0.22 | 0.50 | Ca: 0.008 |
| 8 | 0.38 | 0.27 | 2.4 | 0.001 | 0.01 | 0.0014 | 0.0034 | 2.51 | 2.78 | — |
| 9 | 0.15 | 0.25 | 1.9 | 0.005 | 0.02 | 0.002 | 0.0041 | 1.86 | 2.11 | Ti: 0.01 |

TABLE 1-continued

| No. of Steel Species | C | Si | Mn | O | P | S | N | Al | Al + Si | Others |
|---|---|---|---|---|---|---|---|---|---|---|
| 10 | 0.19 | 0.23 | 1.7 | 0.003 | 0.03 | 0.001 | 0.002 | 1.47 | 1.71 | B: 0.001 |
| 11 | 0.18 | 0.22 | 1.8 | 0.002 | 0.02 | 0.002 | 0.0024 | 2.88 | 3.10 | Mo: 0.1 |
| 12 | 0.2 | 0.30 | 2.6 | 0.002 | 0.03 | 0.001 | 0.0033 | 0.26 | 0.56 | Cr: 0.8 |
| 13 | 0.194 | 0.28 | 2.5 | 0.002 | 0.013 | 0.0015 | 0.0012 | 0.23 | 0.52 | Nb: 0.051 |
| 14 | 0.21 | 0.25 | 2.4 | 0.002 | 0.006 | 0.0042 | 0.0043 | 0.59 | 0.84 | Ti: 0.056, B: 0.0053 |
| 15 | 0.19 | 0.30 | 1.82 | 0.002 | 0.011 | 0.0032 | 0.0027 | 0.69 | 0.99 | Mo: 0.33 |
| 16 | 0.7 | 0.40 | 2.3 | 0.002 | 0.013 | 0.0047 | 0.0039 | 0.42 | 0.82 | — |
| 17 | 0.22 | 0.57 | 2.5 | 0.004 | 0.014 | 0.0037 | 0.0015 | 0.47 | 1.04 | — |
| 18 | 0.1 | 0.33 | 3.5 | 0.004 | 0.014 | 0.0049 | 0.0012 | 2.21 | 2.54 | Ca: 0.015 |
| 19 | 0.12 | 0.32 | 2.5 | 0.01 | 0.13 | 0.033 | 0.001 | 2.50 | 2.82 | — |
| 20 | 0.14 | 0.37 | 2.4 | 0.002 | 0.08 | 0.0015 | 0.005 | 2.90 | 3.27 | — |
| 21 | 0.19 | 0.33 | 2.8 | 0.002 | 0.011 | 0.06 | 0.001 | 0.51 | 0.85 | — |
| 22 | 0.28 | 0.23 | 2.8 | 0.001 | 0.001 | 0.0015 | 0.021 | 0.52 | 0.76 | Mg: 0.0007 |
| 23 | 0.19 | 0.29 | 2.64 | 0.004 | 0.08 | 0.0015 | 0.005 | 13.95 | 14.24 | Ca: 0.003 |
| 24 | 0.35 | 0.02 | 2.4 | 0.003 | 0.08 | 0.0015 | 0.005 | 0.12 | 0.14 | — |

Thereafter, the resultant steel sheets were immersed in a galvanizing bath controlled to predetermined conditions, and the steel sheets were cooled to room temperature. At this time, the effective Al concentration in the galvanizing bath was set to 0.09 to 0.17 mass %. With respect to some of these steel sheets, they were immersed in a galvanizing bath, then were subjected to each of the alloying treatments under a predetermined condition therefor, and were cooled to room temperature. Finally, the thus obtained steel sheet was skin-pass rolled at a rolling reduction ratio of 0.4%.

Heat treatment conditions and plating treatment conditions are shown in Table 2.

The tensile properties were evaluated by pulling a JIS No. 5 tensile test piece in C direction. As for the identification of structure, observation of existing position and measurements of average grain size (average equivalent-circle diameter) and occupancy, the steel sheet in a cross-section in the rolling direction or in a cross-section perpendicular to the rolling direction was etched with a nital reagent, and quantitative determination was made by observation through an optical microscope at 500 to 1,000 times.

As for the V-bending property, a test was performed based on JIS Z 2248, and after performing the test for punch R of 0.5 mm, 1 mm and 2 mm, the steel sheet was observed with an eye and judged as follows. "A" was accepted.

A: No cracking.

B: Slight cracking (a plurality of cracks were generated on the outer surface of bending).

C: Cracking occurred.

TABLE 2

| Test No. | No. of Steel Species | Take-Up Temperature [° C.] | Cold Rolling Reduction [%] | Annealing Temperature [° C.] | Temporary Cooling Temperature [° C.] | Primary Cooling Rate [° C./sec] | Remarks |
|---|---|---|---|---|---|---|---|
| a | 1 | 500 | 50 | 950 | 678 | 1.2 | Steel of Invention |
| b | 2 | 690 | 55 | 830 | 690 | 1.9 | Steel of Invention |
| c | 3 | 550 | 57 | 840 | 735 | 3.4 | Steel of Invention |
| d | 4 | 400 | 49 | 740 | 740 | 1.8 | Steel of Invention |
| e | 5 | 400 | 69 | 810 | 719 | 2.9 | Steel of Invention |
| f | 6 | 500 | 48 | 800 | 684 | 13.5 | Steel of Invention |
| g | 7 | 600 | 49 | 830 | 699 | 10.8 | Steel of Invention |
| h | 8 | 550 | 50 | 850 | 705 | 16.4 | Steel of Invention |
| i | 9 | 630 | 50 | 840 | 695 | 2.5 | Steel of Invention |
| j | 10 | 620 | 50 | 750 | 740 | 2.4 | Steel of Invention |
| k | 11 | 660 | 45 | 760 | 705 | 1.9 | Steel of Invention |
| l | 12 | 550 | 60 | 800 | 710 | 10.9 | Steel of Invention |
| m | 13 | 530 | 50 | 840 | 730 | 5.4 | Steel of Invention |
| n | 14 | 560 | 50 | 850 | 700 | 8.2 | Steel of Invention |
| o | 15 | 600 | 50 | 860 | 720 | 6.2 | Steel of Invention |
| p | 16 | 500 | 60 | 810 | 729 | 1.9 | Comparative Steel |
| q | 17 | 600 | 50 | 810 | 658 | 1.8 | Comparative Steel |
| r | 18 | 650 | 50 | 840 | 690 | 2.5 | Comparative Steel |
| s | 19 | 600 | 50 | 850 | 688 | 2.7 | Comparative Steel |
| t | 20 | 610 | 50 | 850 | 678 | 3.4 | Comparative Steel |
| u | 21 | 540 | 50 | 850 | 699 | 1.6 | Comparative Steel |
| v | 22 | 680 | 50 | 850 | 725 | 2.7 | Comparative Steel |
| w | 23 | 350 | 50 | 850 | 734 | 10.9 | Comparative Steel |
| x | 24 | 390 | 50 | 850 | 719 | 11.3 | Comparative Steel |
| aa | 4 | 500 | 50 | 850 | 746 | 11.4 | Comparative Steel |
| ab | 4 | 500 | 90 | 850 | 720 | 12.5 | Comparative Steel |
| ac | 4 | 500 | 50 | 850 | 670 | 10.7 | Comparative Steel |
| ad | 4 | 500 | 50 | 850 | 600 | 1.5 | Comparative Steel |
| ae | 4 | 500 | 50 | 850 | 740 | 38.1 | Comparative Steel |
| af | 4 | 500 | 50 | 850 | 740 | 1.8 | Comparative Steel |

TABLE 2-continued

| | Conditions of Repeated Bending During Holding | | | | | | | | |
|---|---|---|---|---|---|---|---|---|---|
| Test No. | Holding Time at 350 to 550° C. | Bending R [nm] | Tension Longitudinal-Average Stress [MPa] | Number of Occurrences of Bending | Plating Treatment | Ferrite [%] | Retained Austenite [%] | Martensite [%] | Remarks |
| a | 150 | 900 | 35 | 5 | GI | 52 | 10 | 3 | Steel of Invention |
| b | 180 | 800 | 25 | 4 | GI | 53 | 9 | 2 | Steel of Invention |
| c | 170 | 400 | 35 | 5 | GA | 56 | 11 | 3 | Steel of Invention |
| d | 120 | 1200 | 23 | 6 | GA | 55 | 12 | 2 | Steel of Invention |
| e | 190 | 1400 | 35 | 3 | GI | 52 | 9 | 3 | Steel of Invention |
| f | 400 | 1300 | 70 | 4 | GI | 55 | 8 | 4 | Steel of Invention |
| g | 300 | 900 | 30 | 5 | GI | 53 | 10 | 5 | Steel of Invention |
| h | 260 | 700 | 30 | 5 | GA | 50 | 12 | 6 | Steel of Invention |
| i | 180 | 100 | 15 | 4 | GA | 55 | 14 | 1 | Steel of Invention |
| j | 190 | 200 | 35 | 4 | GA | 52 | 15 | 3 | Steel of Invention |
| k | 250 | 1300 | 45 | 1 | GA | 49 | 11 | 3 | Steel of Invention |
| l | 280 | 2600 | 50 | 6 | GA | 47 | 10 | 4 | Steel of Invention |
| m | 800 | 1200 | 50 | 6 | GA | 45 | 10 | 5 | Steel of Invention |
| n | 260 | 1400 | 40 | 5 | GA | 50 | 9 | 2 | Steel of Invention |
| o | 300 | 400 | 35 | 3 | GA | 52 | 12 | 5 | Steel of Invention |
| p | 120 | 1500 | 10 | 1 | GI | 33 | 0 | 25 | Comparative Steel |
| q | 130 | 1400 | 30 | 1 | GA | 53 | 4 | 4 | Comparative Steel |
| r | 250 | 1300 | 12 | 6 | GI | 29 | 3 | 21 | Comparative Steel |
| s | 270 | 900 | 10 | 8 | GA | 20 | 10 | 20 | Comparative Steel |
| t | 340 | 800 | 32 | 5 | GI | 37 | 4 | 2 | Comparative Steel |
| u | 370 | 300 | 23 | 4 | GA | 35 | 2 | 12 | Comparative Steel |
| v | 400 | 1500 | 15 | 1 | GI | 39 | 2 | 22 | Comparative Steel |
| w | 250 | 2600 | 4 | 6 | GA | 45 | 10 | 3 | Comparative Steel |
| x | 260 | 2700 | 65 | 6 | GI | 43 | 11 | 1 | Comparative Steel |
| aa | 160 | 900 | 22 | 2 | GI | 40 | 9 | 2 | Comparative Steel |
| ab | 145 | 800 | 20 | 3 | GA | 44 | 12 | 2 | Comparative Steel |
| ac | 178 | 450 | 40 | 1 | GI | 49 | 11 | 3 | Comparative Steel |
| ad | 162 | 500 | 15 | 5 | GA | 51 | 8 | 4 | Comparative Steel |
| ae | 250 | 1600 | 10 | 1 | GI | 52 | 12 | 2 | Comparative Steel |
| af | 90 | 500 | 35 | 1 | GA | 55 | 5 | 2 | Comparative Steel |

| Test No. | Bainite [%] | Pearlite [%] | TS [MPA] | EL [%] | λ [% &] | TS × EL | TS × λ | Average C Concentration in Retained γ | Average Grain Size of Retained γ [μm] | Residual Stress of Retained γ (average) Mpa | Remarks |
|---|---|---|---|---|---|---|---|---|---|---|---|
| a | 26 | 9 | 987 | 20 | 59 | 19740 | 58233 | 0.8 | 8 | −110 | Steel of Invention |
| b | 34 | 2 | 1168 | 19 | 48 | 22192 | 56064 | 0.9 | 10 | −80 | Steel of Invention |
| c | 21 | 9 | 1186 | 18 | 49 | 21348 | 58114 | 1.2 | 7 | 85 | Steel of Invention |
| d | 22 | 9 | 1239 | 20 | 45 | 24780 | 55755 | 1.1 | 7 | −250 | Steel of Invention |
| e | 29 | 7 | 1379 | 13 | 30 | 17927 | 41370 | 0.7 | 8 | −20 | Steel of Invention |
| f | 20 | 13 | 1480 | 12 | 32 | 17760 | 47360 | 0.8 | 7 | 50 | Steel of Invention |
| g | 22 | 10 | 1021 | 24 | 51 | 24504 | 52071 | 0.9 | 8 | 8 | Steel of Invention |
| h | 10 | 22 | 1450 | 12 | 31 | 17400 | 44950 | 1.1 | 6 | −200 | Steel of Invention |
| i | 24 | 6 | 1185 | 17 | 45 | 20145 | 53325 | 1 | 8 | −350 | Steel of Invention |
| j | 30 | 0 | 1205 | 16 | 46 | 19280 | 55430 | 0.9 | 9 | −220 | Steel of Invention |
| k | 21 | 16 | 989 | 23 | 50 | 22747 | 49450 | 0.8 | 9 | −50 | Steel of Invention |
| l | 32 | 7 | 1201 | 17 | 35 | 20417 | 42035 | 0.7 | 9 | −75 | Steel of Invention |
| m | 28 | 12 | 1186 | 19 | 39 | 22534 | 46254 | 1.2 | 9 | 55 | Steel of Invention |
| n | 22 | 17 | 1208 | 17 | 34 | 20536 | 41072 | 1.1 | 10 | −27 | Steel of Invention |
| o | 23 | 8 | 1226 | 16 | 32 | 19616 | 39232 | 0.9 | 8 | −80 | Steel of Invention |
| p | 21 | 21 | 1550 | 5 | 18 | 7750 | 27900 | 0 | 20 | 120 | Comparative Steel |
| q | 27 | 12 | 1264 | 10 | 15 | 12640 | 18960 | 0.5 | 12 | 150 | Comparative Steel |
| r | 22 | 25 | 1197 | 12 | 13 | 14364 | 15561 | 0.6 | 13 | 280 | Comparative Steel |
| s | 39 | 11 | 1201 | 10 | 8 | 12010 | 9608 | 0.65 | 14 | −430 | Comparative Steel |
| t | 28 | 29 | 1259 | 11 | 7 | 13849 | 8813 | 0.34 | 14 | −250 | Comparative Steel |
| u | 34 | 17 | 925 | 15 | 10 | 13875 | 9250 | 1.6 | 15 | −467 | Comparative Steel |
| v | 22 | 15 | 945 | 11 | 19 | 10395 | 17955 | 1.9 | 16 | −370 | Comparative Steel |
| w | 20 | 22 | 884 | 10 | 29 | 8840 | 25636 | 2 | 20 | 230 | Comparative Steel |
| x | 23 | 22 | 1387 | 7 | 27 | 9709 | 37449 | 2.2 | 19 | −450 | Comparative Steel |
| aa | 29 | 20 | 1184 | 17 | 25 | 20128 | 29600 | 2.2 | 12 | 300 | Comparative Steel |
| ab | 35 | 7 | 584 | 39 | 50 | 22776 | 29200 | 2.7 | 19 | 198 | Comparative Steel |
| ac | 29 | 8 | 1480 | 12 | 45 | 17760 | 66600 | 2.53 | 18 | −430 | Comparative Steel |
| ad | 28 | 9 | 785 | 35 | 39 | 27475 | 30615 | 0.4 | 19 | −390 | Comparative Steel |
| ae | 30 | 4 | 1280 | 11 | 40 | 14080 | 51200 | 0.5 | 19 | 300 | Comparative Steel |
| af | 22 | 16 | 1320 | 6 | 30 | 7920 | 39600 | 0.6 | 15 | 130 | Comparative Steel |

TABLE 2-continued

| Test No. | Percentage (%) of Retained γ Having Residual Stress Satisfying Formula (1) | Aspect Ratio | V-Bendability Bending R: 2.0 | Bending R: 1.0 | Bending R: 0.5 | Remarks |
|---|---|---|---|---|---|---|
| a | 70 | 0.77 | A | A | A | Steel of Invention |
| b | 85 | 0.75 | A | A | A | Steel of Invention |
| c | 64 | 0.85 | A | A | A | Steel of Invention |
| d | 66 | 0.92 | A | A | A | Steel of Invention |
| e | 75 | 0.88 | A | A | A | Steel of Invention |
| f | 93 | 0.79 | A | A | A | Steel of Invention |
| g | 95 | 0.69 | A | A | A | Steel of Invention |
| h | 65 | 0.71 | A | A | A | Steel of Invention |
| i | 51 | 0.59 | A | A | A | Steel of Invention |
| j | 77 | 0.79 | A | A | A | Steel of Invention |
| k | 91 | 0.84 | A | A | A | Steel of Invention |
| l | 91 | 0.92 | A | A | A | Steel of Invention |
| m | 56 | 0.9 | A | A | A | Steel of Invention |
| n | 66 | 0.88 | A | A | A | Steel of Invention |
| o | 81 | 0.72 | A | A | A | Steel of Invention |
| p | 31 | 0 | A | B | C | Comparative Steel |
| q | 48 | 0.43 | A | A | B | Comparative Steel |
| r | 21 | 0.44 | A | B | C | Comparative Steel |
| s | 15 | 0.32 | A | A | B | Comparative Steel |
| t | 35 | 0.98 | B | C | C | Comparative Steel |
| u | 15 | 0.97 | B | C | C | Comparative Steel |
| v | 25 | 0.99 | A | A | C | Comparative Steel |
| w | 39 | 0.45 | A | A | B | Comparative Steel |
| x | 10 | 0.35 | A | A | C | Comparative Steel |
| aa | 29 | 0.12 | B | B | C | Comparative Steel |
| ab | 49 | 0.44 | A | B | C | Comparative Steel |
| ac | 33 | 0.98 | A | A | B | Comparative Steel |
| ad | 44 | 0.96 | A | A | B | Comparative Steel |
| ae | 43 | 0.95 | A | C | C | Comparative Steel |
| af | 43 | 0.96 | A | B | C | Comparative Steel |

The method for measuring the percentage of retained austenite was performed on a surface formed by chemical polishing to a ¼ thickness from the surface layer of the sample material sheet, and the retained austenite was quantitatively determined from the integrated intensities of (200) and (211) planes of ferrite and the integrated intensities of (200), (220) and (311) planes of austenite, which were measured with a mono-chromatized MoKα ray.

The method for measuring the residual stress (σR) of the retained austenite phase was performed on a surface formed by chemical polishing to a ¼ thickness from the surface layer of the sample material sheet, and the average of 10 points was determined using a high-resolution X-ray diffractometer. The high-resolution X-ray diffractometer used in this test was D8 DISCOVER Hybrid Super Speed Solution manufactured by Bruker AXS K.K. Using the strain (εR) determined from the diffraction plane spacing distribution recorded by the diffractometer and the Young's modulus (E) of steel material, the residual stress (σR) may be obtained according to the following formula (2):

$$\sigma R = \varepsilon R \times E \quad (2)$$

Test Nos. "a" to "o" are Examples of the present invention, where all properties passed and a steel sheet having target properties was obtained. On the other hand, in Test Nos. "p" to "ag" where the component or production process is outside the scope of the present invention, any of the properties failed.

INDUSTRIAL APPLICABILITY

According to the present invention, a high-strength hot-dip galvanized steel sheet excellent in the elongation, and V-bendability may be provided. The production of the high-strength hot-dip galvanized steel sheet may be relatively easy and can be performed stably. Therefore, the high-strength hot-dip galvanized steel sheet according to the present invention may be optimal particularly as a steel sheet for automobiles pursuing weight reduction in recent years, and its industrial value may be remarkably high.

What is claimed is:

1. A hot-dip galvanized steel sheet, which is a steel sheet comprising, in mass %,
   C: from 0.10 to 0.4%,
   Si: from 0.01 to 0.5%,
   Mn: from 1.0 to 3.0%,
   O: 0.006% or less,
   P: 0.04% or less,
   S: 0.01% or less,
   Al: from 0.1 to 3.0%,
   N: 0.01% or less, and
   Si+Al≥0.5%, with a balance comprising Fe and unavoidable impurities,
   wherein the steel sheet is a high-strength hot-dip galvanized steel sheet comprising, as a main phase, in terms of volume fraction, 40% or more of ferrite and from 8 to 60% of retained austenite, and a balance structure comprises any one member or two or more members of bainite, martensite and pearlite,
   wherein out of the austenite, an austenite grain having an average residual stress σR satisfying formula (1) accounts for 50% or more:

$$-400 \text{ MPa} \leq \sigma R \leq 200 \text{ MPa} \quad (1)$$

and
   wherein the steel sheet has, on a surface thereof, a hot-dip galvanized layer comprising Fe in an amount of less than 7 mass %, with a balance being Zn, Al and unavoidable impurities, and
   tensile strength of the steel sheet is 980 MPa or more.

2. The hot-dip galvanized steel sheet according to claim 1, wherein an average particle size of the austenite is 10 μm or less, and an average C concentration in the austenite is 0.7% or more to 1.5% or less in terms of mass %.

3. The hot-dip galvanized steel sheet according to claim 1, wherein an average aspect ratio with respect to a rolling direction of the austenite grain is from 0.5 to 0.95.

4. The hot-dip galvanized steel sheet according to claim 1, wherein the steel sheet further comprises one member or two or more members of, in mass %,
Mo: from 0.02 to 0.5,
Nb: from 0.01 to 0.10%,
Ti: from 0.01 to 0.20%,
V: from 0.005 to 0.10%,
Cr: from 0.1 to 2.0%,
Ca: from 0.0005 to 0.05%,
Mg: from 0.0005 to 0.05%,
REM: from 0.0005 to 0.05%,
Cu: from 0.04 to 2.0%,
Ni: from 0.02 to 1.0%,
B: from 0.0003 to 0.007%.

5. The hot-dip galvanized steel sheet according to claim 2, wherein the average aspect ratio with respect to a rolling direction of the austenite grain is from 0.5 to 0.95.

6. The hot-dip galvanized steel sheet according to claim 2, wherein the steel sheet further comprises one member or two or more members of, in mass %,
Mo: from 0.02 to 0.5,
Nb: from 0.01 to 0.10%,
Ti: from 0.01 to 0.20%,
V: from 0.005 to 0.10%,
Cr: from 0.1 to 2.0%,
Ca: from 0.0005 to 0.05%,
Mg: from 0.0005 to 0.05%,
REM: from 0.0005 to 0.05%,
Cu: from 0.04 to 2.0%,
Ni: from 0.02 to 1.0%,
B: from 0.0003 to 0.007%.

* * * * *

UNITED STATES PATENT AND TRADEMARK OFFICE
CERTIFICATE OF CORRECTION

PATENT NO. : 10,351,936 B2
APPLICATION NO. : 15/376305
DATED : July 16, 2019
INVENTOR(S) : Koichi Sato et al.

Page 1 of 1

It is certified that error appears in the above-identified patent and that said Letters Patent is hereby corrected as shown below:

In the Specification

At Column 6, at Line 52: Change "0.13 to 0.3" to -- 0.1 to 0.38 -- and "0.19 to 0.28" to -- 0.12 to 0.38 --

At Column 6, at Line 63: Change "0.2" to -- 0.02 --

At Column 7, at Line 7: Change "1.0" to -- 1.2 --

At Column 7, at Line 36: Change "0.025%" to -- 0.02% --

At Column 8, at Line 16: Change "Cr" to -- Mo --

At Column 8, at Lines 58 and 59: Please remove the following sentence, "The V content may preferably be from 0.005 to 0.4%, more preferably from 0.005 to 0.3%."

At Column 9, at Line 3: Change "0.04%" to -- 0.05% --

At Column 13, at Line 28: Change "temperature." to -- temperature. The plating weight of both sides was set at 35 g/m². --

At Column 13, at Line 29: Change "0.4%." to -- 0.4%. After annealing and plating, 1% skin pass rolling was performed for the purpose of suppressing a yield point elongation. --

Signed and Sealed this
First Day of September, 2020

Andrei Iancu
*Director of the United States Patent and Trademark Office*